United States Patent [19]

Taunay

[11] Patent Number: 4,679,841

[45] Date of Patent: Jul. 14, 1987

[54] COUNTERBALANCING DEVICE FOR HATCHBACK LID ON A ROAD VEHICLE

[75] Inventor: Claude Taunay, Velizy, France

[73] Assignees: Automobiles Peugeot, Paris; Automobiles Citroen, Neuilly sur-Seine, both of France

[21] Appl. No.: 909,185

[22] Filed: Sep. 19, 1986

[30] Foreign Application Priority Data

Sep. 23, 1985 [FR] France ................................ 8514075

[51] Int. Cl.[4] ...................... B62D 25/12; E05F 11/00; E05F 1/12

[52] U.S. Cl. ...................................... 296/76; 296/106; 296/146; 49/276; 49/386; 16/288; 16/302; 16/364

[58] Field of Search ................... 296/56, 76, 106, 146; 49/276, 278, 386; 16/223, 288, 284, 302, 364; 267/0.5 A

[56] References Cited

U.S. PATENT DOCUMENTS 2,639,462 5/1953 Fish ...................................... 296/76
3,351,975 11/1974 Goto .................................... 16/288
4,587,760 5/1986 Brissette ............................ 49/386 X

FOREIGN PATENT DOCUMENTS 164811 10/1982 Japan .................................. 296/146
2005199 4/1979 United Kingdom .

*Primary Examiner*—Robert B. Reeves
*Assistant Examiner*—Dennis H. Pedder
*Attorney, Agent, or Firm*—Burns, Doane, Swecker & Mathis

[57] ABSTRACT

A counterbalancing device for a hatchback lid on a road vehicle includes a lid hinged at the top about a horizontal axis to the superstructure of the vehicle and at least one counterbalancing unit such as a pneumatic spring. One end of the counterbalancing unit is pivoted to the superstructure and the other end is pivoted to the lid. The counterbalancing unit is pivotally connected to one of the lid and the superstructure by a first lever. A first end of a link is pivotally connected to the first lever; a second end of the link is pivotally connected to a second lever which, in turn, is connected to the one of the superstructure and the lid. A roller carried by the second lever bears against the superstructure or the lid near the closed position of the lid. The device is more efficient than known devices irrespective of the layout of the lid.

4 Claims, 5 Drawing Figures

FIG. 1
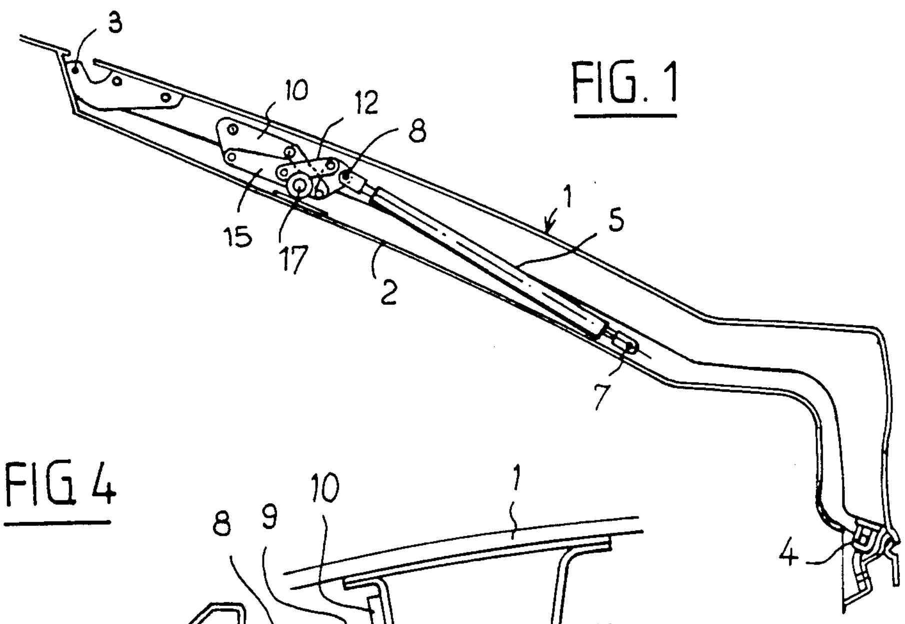
FIG 4
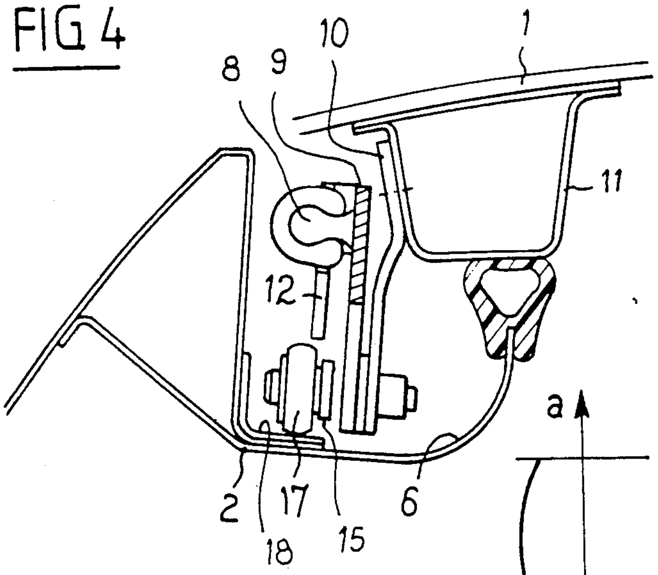
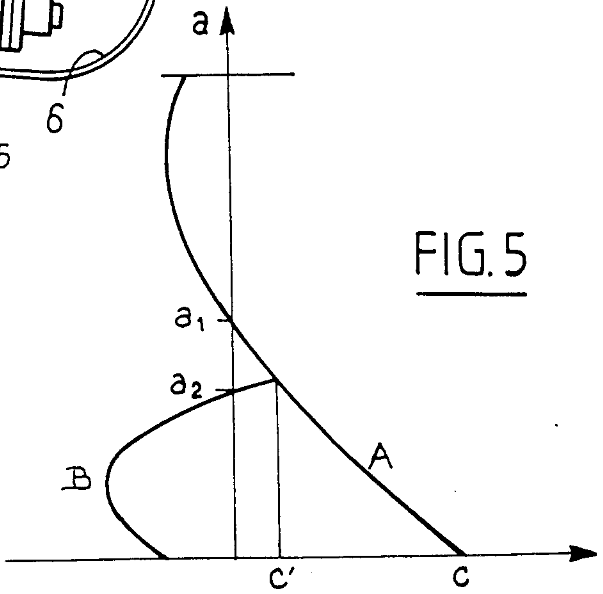
FIG. 5

COUNTERBALANCING DEVICE FOR HATCHBACK LID ON A ROAD VEHICLE

The invention refers to a device which ensures the counterbalancing of an opening hatchback lid located at the rear of a road vehicle to whose superstructure it is hinged at the top about a horizontal axis.

It is known that this counterbalancing is achieved using one or two units such as pneumatic springs hinged at one end to the superstructure and at the other end to the lid. These units are preferably placed in the rain channels of each side of the lid. The purpose of these units is to exert a couple on the lid which is antagonistic to the couple of its weight, so assisting its opening and ensuring that it is held in the open position.

Unfortunately, the location of these springs in the side rain channels means that, starting from the closed position, their line of movement passes very close to the lid hinge axis, so much so that the couple produced is very much less than the antagonistic couple due to the weight of the lid, in such a manner that the user is obliged to exert considerable force at the start of opening.

This is why it has already been proposed to fit counterbalance units using levers and cams, so that the load they exert may be better used to assist initial opening of the lid.

However, for some lid layouts (dimensions, weights, angle when closed) the known devices are either too bulky or they do not have sufficient couple to act on a large enough lid opening angle.

The purpose of the invention is to provide a device which, while remaining simple, proves more efficient than known devices irrespective of lid lay-out.

Thus the invention relates to a counter-balancing device for a rear hatchback lid or a road vehicle, the said lid being hinged at the top to the vehicle superstructure about a horizontal axis and comprising at least one counterbalance unit such as a pneumatic spring hinged at one end to the superstructure and at the other end to the lid.

This device is characterized in that the pneumatic spring is hinged to the lid (or the superstructure) by means of a first lever on which is hinged the first end of a link whose second end is hinged on a second lever at an intermediate point between a hinge on the said second lever on the lid (or the superstructure) and a roller working together with the superstructure (or the lid) near the closed position of the lid.

A non-limiting design example of the invention is the subject of the description which follows, according to the attached drawings, in which:

FIG. 1 is a schematic view in vertical section of a rear hatchback lid fitted with a counter-balance device according to the invention seen in elevation, parallel to the vehicle axis;

FIG. 4 is a sectional view taken across line IV—IV in FIG. 2;

FIG. 5 is a diagram showing the couple attained by the lid depending on its angle of opening.

Figure 2:
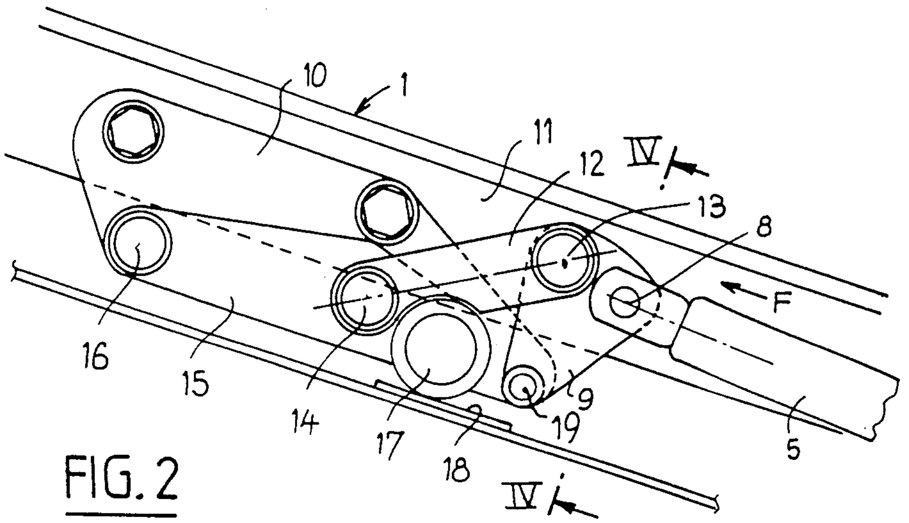
FIG. 2 is a partial view on a larger scale of the device shown in FIG. 1, the lid being closed.

In FIG. 1, a hatchback lid 1 of a road vehicle is seen hinged to the superstructure 2 at its top about a horizontal transverse axis 3. A lock 4 holds this lid 1 closed.

A counterbalance unit on at least one side of the lid 1 consisting, for example, of a pneumatic spring 5, assists opening of lid 1 and ensures its retention when open. This spring 5, located in a side rain channel 6 (FIG. 4) is connected by a first end to the superstrucutre 2 by means of a hinge 7 and by its other end to lid 1 by means of a hinge 8.

This hinge 8, which may be seen better in FIG. 2, is carried by a first lever 9 hinged at 19 on a plate 10 fixed to the side edge of frame 11 on lid 1. A link 12 is connected by a hinge 13 to a first lever 9 and by a hinge 14 to a second lever 15 itself connected to plate 10 by a hinge 16.

The hinge 14 of link 12 is located on second lever 15 at an intermediate point between joint 16 and a roller 17 fitted at the end of lever 15 opposite to hinge 16 which connects the lever 15 to the plate 10. Roller 17 works together with the bottom of rain channel 6 on which it rests when lid 1 is in the closed position. A protective plate 18, for example in soft plastic, is inserted preferably between roller 17 and the bottom of rain channel 6.

Figure 3:
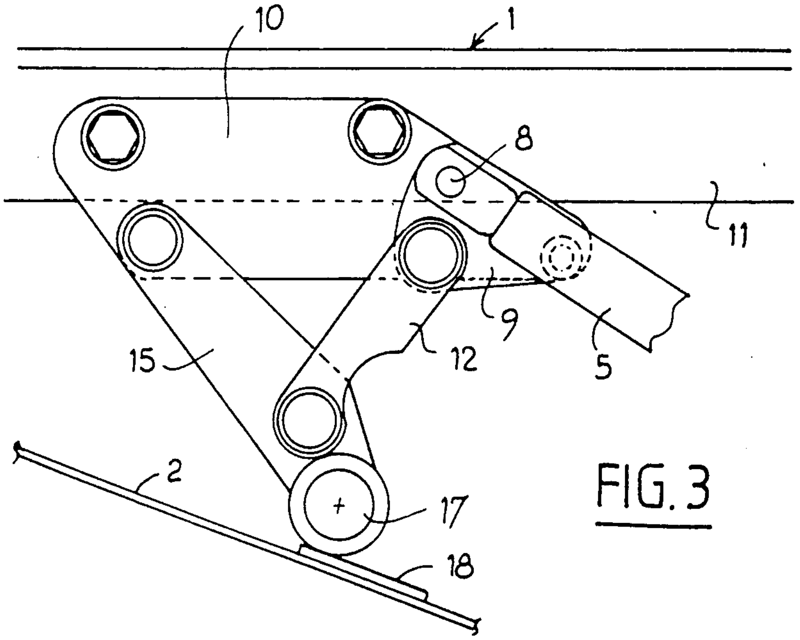
FIG. 3 is a similar view to FIG. 2, the lid being partly open.

The action of the device described above is very simple:

The force exerted by pneumatic spring 5 creates a couple in the direction of arrow F on first lever 9. This couple produces a load on link 12 in the direction of second lever 15 which, taking leverage on superstructure 2 with its roller 17, tends to lift lid 1. This lifting movement takes effect immediately lock 4 is released. When the second lever 15 is fully extended (FIG. 3), the arm of the line of movement lever for spring 5 is sufficiently long in relation to hinge 3 on lid 1 for spring 5 to exert a considerable lifting couple on lid 1.

Preferably, however, less manual effort should be required after initial opening of lid 1 before automatic opening takes place thus preventing the inconvenience of an uncontrolled opening of too fierce a nature.

Curve A on the diagram in FIG. 5 shows the effective couple on lid 1 depending on its angle of opening "a", resulting from the difference between the couple due to the assistance and the couple due to its own weight, if hinge 9 of spring 5 was directly bearing on the lid. It is seen that couple C, and therefore the force needed by the user to release lid 1, is relatively high, the assistance couple taking preponderance only in the last half sector of opening (commencing at angle a1) to ensure automatic action.

Curve B shows, under the same conditions, the effective couple on lid 1 due to the device according to the invention. The assistance effect is then preponderant from the commencement which means automatic opening of the lid as far as angle a2. Less couple is required from then on, equal to the maximum at C', in order to regain the automatic action commencing at angle a1.

It is fitting to note that the device described may be located possibly at the other end of spring 5, plate 10 then being fixed to superstructure 2 and roller 17 working together with lid 1. However, in this solution, the action of raising the lid would be more limited in angle due to the movement of second lever 15.

What is claimed is:

1. A counterbalance device for a rear hatchback lid on a road vehicle, said lid being hinged at a top on superstructure of the vehicle about a horizontal axis and comprising at least one counterbalance unit one end of which is pivoted on the superstructure and the other end to the lid, characterized in that said counterbalance unit is pivoted to one of said lid and said superstructure by means of an input lever and a camming lever both pivoted at a first end portion to said one of said lid and said superstructure, said counterbalance unit being pivoted to said input lever, a link pivoted at opposite end portions to said input and camming levers, a second end portion of said camming lever having a roller bearing against the other of said lid and said superstructure during initial movement of said lid from a closed position.

2. The device according to claim 1, wherein the roller is fitted at the end of the camming lever opposite to the pivot of the camming lever to one of said lid and said superstructure.

3. The device according to claim 1, wherein the input lever and the camming lever are pivoted on a plate fixed to said lid.

4. The device according to claim 1 wherein the counterbalance unit comprises a pneumatic spring.

* * * * *